United States Patent [19]

Fink et al.

[11] Patent Number: 4,678,265

[45] Date of Patent: Jul. 7, 1987

[54] OPTICAL FIBER PLUG DEVICE INCLUDING FIBER FOR MONITORING A LIGHT SOURCE

[75] Inventors: Ludwig Fink, Pullach; Hans-Norbert Toussaint, Munich, both of Fed. Rep. of Germany

[73] Assignee: Siemens Aktiengesellschaft, Berlin and Munich, Fed. Rep. of Germany

[21] Appl. No.: 613,265

[22] Filed: May 24, 1984

[30] Foreign Application Priority Data

Jun. 10, 1983 [DE] Fed. Rep. of Germany ... 8317054[U]

[51] Int. Cl.⁴ .......................... G02B 6/36; H01J 5/16
[52] U.S. Cl. ............................ 350/96.20; 350/96.15; 350/96.22; 350/96.21; 250/227
[58] Field of Search ............ 350/96.10, 96.15, 96.16, 350/96.20, 96.21, 96.22, 96.29, 96.30; 250/227

[56] References Cited

U.S. PATENT DOCUMENTS

| | | | |
|---|---|---|---|
| 3,947,088 | 3/1976 | French | 250/227 |
| 4,071,753 | 1/1978 | Fulenwider et al. | 250/227 |
| 4,530,566 | 7/1985 | Smith et al. | 250/227 |

FOREIGN PATENT DOCUMENTS

| | | | |
|---|---|---|---|
| 3776066 | 4/1975 | Fed. Rep. of Germany ... | 350/96.21 |
| 60-144031 | 7/1985 | Japan | 455/600 |

Primary Examiner—William L. Sikes
Assistant Examiner—Brian M. Healy
Attorney, Agent, or Firm—Hill, Van Santen, Steadman & Simpson

[57] ABSTRACT

A light waveguide plug device which has a body with a concentric bore for receiving a light waveguide being received in a guide sleeve which supports an optical light transmitter such as an LED for emitting light which is coupled into an end of the light waveguide in the bore characterized by an arrangement to sense the condition of the optical light transmitter or LED which comprises an additional or second bore receiving an additional or second light waveguide whose end receives some of the light scatter from the transmitter and conducts it to an optoelectrical transducer to convert the light into electrical signals utilized to monitor the condition of the transmitter.

6 Claims, 2 Drawing Figures

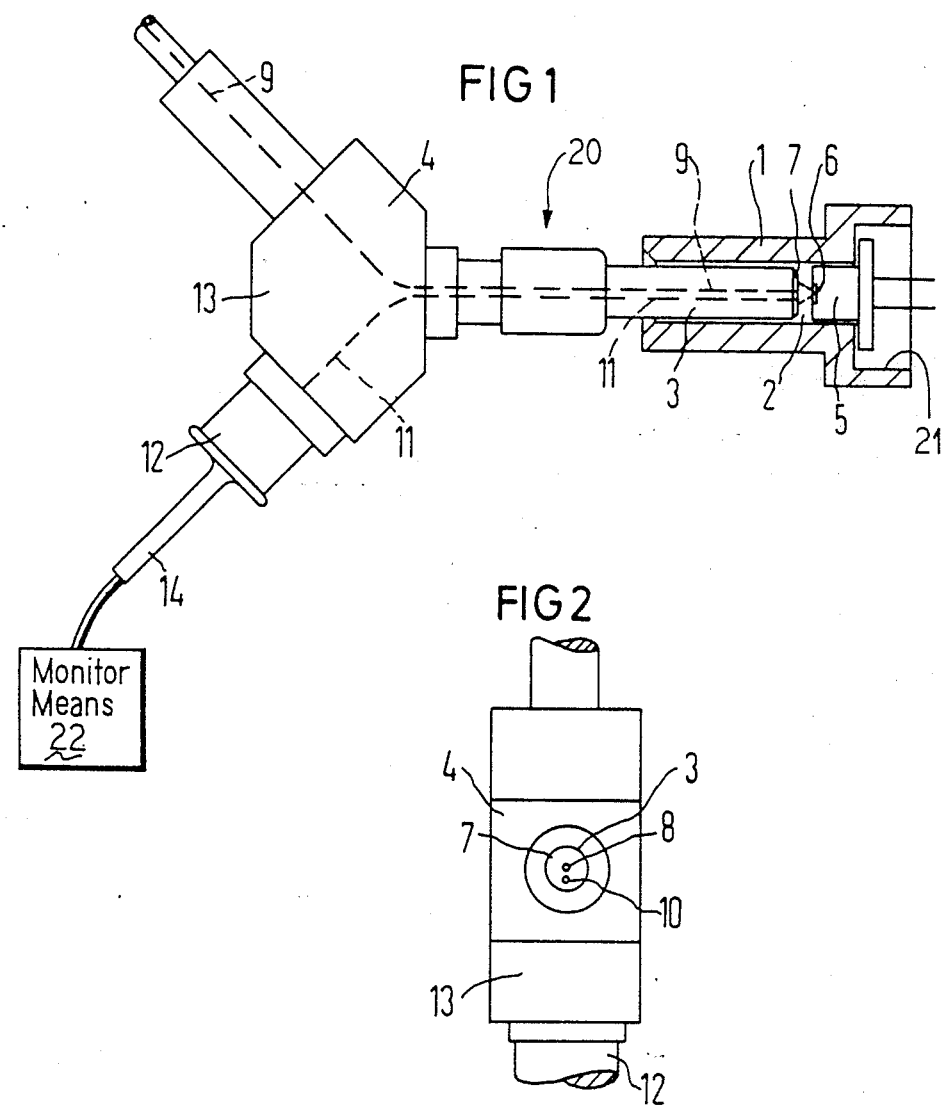

OPTICAL FIBER PLUG DEVICE INCLUDING FIBER FOR MONITORING A LIGHT SOURCE

BACKGROUND OF THE INVENTION

The present invention is directed to a light waveguide plug device which has two halves with one of the halves being a body provided with a concentric bore for receiving a light waveguide with the end of the light waveguide lying in the plane of the end face of the body and the body being adjustably received in the other half of the plug device which carries a light-emitting surface so that the end of the light waveguide is in the desired position for receiving light from the light-emitting surface.

A light waveguide plug device is disclosed in German Gebrauchmuster No. 37 76 066. This device has a guide sleeve which has a bore that extends axially therethrough. A pin-like body having a concentric bore containing a light waveguide is inserted from one end of the guide sleeve and a housing of an LED can be inserted in the other end of the guide sleeve. With suitable dimensioning of these various parts, a desired adjustment of the end face of the light waveguide to the optical active region or surface of the LED can be obtained so that the light emitted by the LED is beamed into the light waveguide with a high efficiency.

Given such a light waveguide plug device which is provided for the connection of an optical transmitter to the light waveguide, it is desirable to monitor the intensity of the radiation emitted by the LED in order, for example, to be able to trigger an alarm when the radiated power or intensity drops below a prescribed value.

SUMMARY OF THE INVENTION

It is an object of the present invention to provide a light waveguide plug device, which can connect a light waveguide to an optical transmitter and has an arrangement or means for monitoring the output of the optical transmitter in an uncomplicated fashion.

To accomplish these goals, the present invention is directed to an improvement in a light waveguide plug device having two halves, one of said two halves being a body having a concentric bore receiving a light waveguide with an end of the light waveguide being adjacent the end face of the body and the other half of the two halves having a light exit surface of a light transmitter, said body being adjustable relative to the other half so that the end face is adjustably positioned relative to the light exit surface. The improvement comprises the body having an additional or second bore having an end adjacent the concentric bore at the end face of the body and an additional or second light waveguide having an end surface being disposed in said additional bore with the end surface at the end face of the body so that with the body in a desired position relative to the light exit surface, light of the light exit surface is also beamed into the end surface of the additional or second waveguide and is conducted to mean for converting the light into an electrical signal.

In this uncomplicated fashion, the additional or second light waveguide receives radiation from the light transmitter or LED whose intensity will vary in the same manner as the intensity of the light beamed into the light waveguide disposed in the concentric bore. The radiation received by the second or additional light waveguide can be brought to a location at which an optoelectrical transducer means converts it into an electrical quantity such as a current or voltage that is proportional to the intensity of the light. This electrical quantity can then be utilized either to control the means providing power to the LED or to trigger an alarm when the output from the LED drops below a predetermined amount. In either manner, the monitoring signal is provided without interfering with the light flowing in the first-mentioned waveguide in the concentric bore of the body.

It can be provided in another development of the invention that the body is connected to a mounting arrangement for the transducer means which converts the light signal into an electrical signal. For example, the transducer means for converting can be a photodiode or a phototransistor. The second or additional light waveguide, which is positioned in the second or additional bore, is positioned to terminate to direct light traveling therein onto a photosensitive surface of the photodiode or phototransistor.

A structural part is thus designed to serve as a plug pin for a plug connection with the plug pin containing the light waveguide for receiving the optical signals emitted by the LED on the one hand and also provides electrical signals which correspond to the radiant intensity of the LED.

Finally, it can also be provided within the present invention that the body containing the concentric bore is a cylindrical plug pin of a commercially available light waveguide plug device. This commercially available pin has been reformed in an uncomplicated advantageous fashion by means of providing the additional or second bore so that it can be simultaneously utilized for coupling out light from the LED and also for monitoring the output of the LED.

BRIEF DESCRIPTION OF THE DRAWINGS

FIG. 1 is a side view of a light waveguide plug device with portions partially cut away for purposes of illustration in accordance with the present invention; and FIG. 2 is an end view of one-half of the plug device illustrating the two bores for the acceptance of the two separate light waveguides.

DESCRIPTION OF THE PREFERRED EMBODIMENTS

The principles of the present invention are particularly useful in a plug device generally indicated at 20 in FIG. 1. The plug device 20 has a guide sleeve 1, which has a through-bore 2 that extends the length of the sleeve. The bore 2 at one end receives a pin-like section 3 of a half 4 of the plug device 20. The bore 2 which has a counterbore section 21 adjacent the other end, receives a cylindrical housing or base 5 for an LED 6. As illustrated, the counterbore 21 enables an exact positioning of the light-emitting or light exit surface of the LED 6.

The pin-like section 3 terminates at an end face 7 and as best illustrated in FIG. 2, has a concentric bore 8 which receives a waveguide such as an optical fiber 9. The optical waveguide 9 has an end with its face being plane-parallel to the end face 7 of the pin-like section or portion 3.

As a result of a suitable mating of dimensions of the guide sleeve 1, the pin-like section 3 and the housing base 5 to one another, the insertion of the parts 3 and 5 into the guide sleeve 1 simultaneously produces a desired adjustment of the position of the light exit surface of the LED 6 to the end of the light waveguide 9. Thus, light emitted by the LED 6 is coupled as optimally as possible into the light waveguide 9. The light waveguide 9 thus will forward the optical signals which are emitted by the LED for further processing or use.

An additional or second bore 10 (FIG. 2) is also provided in the pin-like section 3 next to the bore 8. Preferably, the mouth or end of the bore 10 is situated on the end face 7 of the pin-like section 3 as close as possible to the mouth or the end of the bore 8. The bore 10 receives an additional or second light waveguide 11 whose end is plane-parallel with the end face 7 of the pin-like section 3 and thus receives light scatter from the LED 6.

The other end of the additional or second light waveguide 3 preferably extends into a projection 13 of the half 4 which is connected to the pin-like section 3. The projection 13 acts as a means for mounting a transducer means 12 for converting optical light signals into electrical signals. As illustrated, this transducer means 12 comprises either a photodiode or a phototransistor which is arranged to receive light signals traveling in the light waveguide 11 and convert them into an electrical quantity or signal such as current and/or voltage. The proportion of the signal, such as the voltage, that is produced will depend on the intensity of the radiation being received and the electrical signal is tapped from the half 4 on a cable 14 to a monitor means 22.

The intensity of the radiation of the LED 6 can now be controlled with the assistance of the electrical signal produced by the means 12 for converting. For example, a drop in the intensity of radiation of the LED below a specific value can be identified and utilized by the monitor means 22 to trigger an alarm. It is also possible for the monitor means 22 to use the output from the means 12 to monitor and control the power source for the LED so that with a decrease in intensity, greater driving current can be applied to the LED.

Although various minor modifications may be suggested by those versed in the art, it should be understood that we wish to embody within the scope of the patent granted hereon, all such modifications as reasonably and properly come within the scope of our contribution to the art.

We claim:

1. In a light waveguide plug device having two halves, one of said two halves being a body with a pin-like section, said section having an end face and a concentric bore receiving an optical fiber as a light waveguide with an end of the waveguide being plane-parallel to the end face of said section of said body and the other half of said two halves having a guide sleeve and a light exit surface of a light transmitter, the plane-parallel end of the waveguide being adjustable relative to the other half by said section being adjustably received in the guide sleeve so that said plane-parallel end of the waveguide receives light from the light exit surface and is adjustably positioned relative to the light exit surface by moving the section in the guide sleeve, the improvements comprising the pin-like section having an additional bore extending along the length of the pin-like section and being both offset and spatially separated from the concentric bore, said additional bore having an end being offset from and situated as closed as possible to an end of the concentric bore at the end face of the pin-like section, and an additional elongated light waveguide having an end surface being disposed in said additional bore with the end surface at the end face of the pin-like section so that with the pin-like section in a desired position relative to the light exit surface, light of the light exit surface is also beamed into the end surface of the additional elongated waveguide.

2. In a light waveguide plug device according to claim 1, wherein the pin-like section is a cylindrical plug pin of a commercially availabe light waveguide device being modified to include the additonal bore.

3. In a light waveguide plug device according to claim 1, which includes transducer means for converting an optical light signal into an electrical signal, said transducer means including a light-sensitive surface, means for mounting the transducer means on said body with another end surface of the additional elongated light waveguide being disposed and aligned with the light-sensitive surface of the transducer means for projecting light coupled into the additional elongated waveguide onto the transducer means.

4. In a light waveguide plug device according to claim 3, wherein the pin-like section is a cylindrical plug pin of a commercially available light waveguide plug device modified to include the additional bore.

5. In a light waveguide plug device accroding to claim 3, wherein the transducer means comprises a photodiode.

6. In a light waveguide plug device according to claim 3, wherein the transducer means comprises a phototransistor.

* * * * *